United States Patent
Taylor

(10) Patent No.: US 9,371,191 B2
(45) Date of Patent: Jun. 21, 2016

(54) BUCKET FOR A BUCKET ELEVATOR

(71) Applicant: Tapco, Inc., St. Louis, MO (US)

(72) Inventor: Paul D. Taylor, Huntleigh, MO (US)

(73) Assignee: TAPCO, INC., St. Louis, MO (US)

(*) Notice: Subject to any disclaimer, the term of this patent is extended or adjusted under 35 U.S.C. 154(b) by 142 days.

(21) Appl. No.: 14/186,769

(22) Filed: Feb. 21, 2014

(65) Prior Publication Data
US 2015/0239670 A1 Aug. 27, 2015

(51) Int. Cl.
B65G 17/12 (2006.01)
B65G 47/40 (2006.01)
B65G 17/42 (2006.01)
B29C 45/00 (2006.01)
B65G 17/36 (2006.01)
B29L 31/00 (2006.01)

(52) U.S. Cl.
CPC .......... B65G 17/126 (2013.01); B29C 45/0055 (2013.01); B65G 17/36 (2013.01); B29C 2045/0058 (2013.01); B29C 2793/009 (2013.01); B29L 2031/712 (2013.01)

(58) Field of Classification Search
None
See application file for complete search history.

(56) References Cited

U.S. PATENT DOCUMENTS

| | | |
|---|---|---|
| 221,207 A | 11/1879 | Avery |
| D20,906 S | 6/1891 | Stuebner |
| 2,625,830 A | 1/1953 | Transeau |
| D227,156 S | 6/1973 | Callies |
| D312,261 S | 11/1990 | Burke |
| 5,143,203 A * | 9/1992 | Hinner ............ B65G 17/126 198/708 |
| D336,091 S | 6/1993 | Kovalak et al. |
| D338,893 S | 8/1993 | Simpson |
| D368,914 S | 4/1996 | Pink et al. |
| 5,526,922 A * | 6/1996 | Clark ............ B65G 17/126 198/708 |
| 6,267,226 B1 | 7/2001 | Jarmain |
| D476,341 S | 6/2003 | Booten et al. |
| 6,695,127 B1 * | 2/2004 | Dobranski ........ B65G 17/36 198/711 |
| D496,052 S | 9/2004 | Braime et al. |
| 7,097,027 B1 | 8/2006 | Chen |
| D601,174 S | 9/2009 | TerBeek |
| 7,698,839 B1 | 4/2010 | Phillips et al. |
| 8,205,742 B2 | 6/2012 | TerBeek |
| 8,240,070 B1 | 8/2012 | Phillips et al. |
| 2001/0050210 A1 | 12/2001 | Kitamura |
| 2004/0026215 A1 | 2/2004 | Snowball |

FOREIGN PATENT DOCUMENTS

WO 2014005991 A1 1/2014

OTHER PUBLICATIONS

Tapco Inc. 6th Edition Elevator Buckets—Elevator Bolts Product Guide; Catalog 2011; 108 pages.
Invitation to Pay Additional Fees and, Where Applicable, Protect Fee for International Application No. PCT/US15/16795; May 13, 2015, 2 pages.
International Search Report and Written Opinion of International Application No. PCT/US15/16795, Jul. 9, 2015, 10 pages.

* cited by examiner

Primary Examiner — Kavel Singh
(74) Attorney, Agent, or Firm — Armstrong Teasdale LLP

(57) ABSTRACT

A bucket is adapted to be spaced relatively close to adjacent buckets and has sides with a contoured upper edge to facilitate carrying material above the water level capacity of the bucket.

21 Claims, 12 Drawing Sheets

BUCKET FOR A BUCKET ELEVATOR

FIELD

The present disclosure relates generally to buckets for a bucket elevator and, more particularly, to a bucket adapted to be spaced relatively close to adjacent buckets and having sides with a contoured upper edge to facilitate carrying material above the water level capacity of the bucket.

BACKGROUND

Bucket elevators are conveying mechanisms typically having a continuous belt with a plurality of buckets attached thereto used to move flowable solid materials (e.g., grains, feeds, fertilizers, seeds, food products, chemicals, sand, salt, gravel) vertically upward from a lower elevation to a higher elevation. In use, a suitable drive mechanism (e.g., an electric motor) is used to drive the continuous belt and thus the buckets around a lower pulley (or foot pulley) and an upper pulley (or head pulley) that is spaced upward from the lower pulley. A supply of flowable solid material is fed to the bucket elevator generally adjacent the lower pulley where it is scooped up by the moving buckets as they pass through the supply of material. The material is then carried upward usually vertical but sometimes at an incline in the bucket to the upper pulley. As the bucket passes over the upper pulley, the material is discharged from the bucket to a discharge chute. The material is thrown from the bucket by centrifugal force as the bucket passes over the upper pulley.

As one can readily appreciate, the total potential capacity of the bucket elevator can be increased by attaching more buckets and/or buckets with more capacity to the continuous belt. Accordingly, there is an ongoing desire for a bucket for a bucket elevator that has an increased capacity and can be spaced relatively close on the continuous belt.

SUMMARY

In one aspect, a bucket for a bucket elevator generally comprises a bottom wall, a back wall, a front wall and a pair of opposed side walls collectively defining an interior chamber. Each of the side walls has a contoured upper edge to facilitate carrying material above the water level capacity of the bucket and the bucket is adapted for spacing less than the nominal projection of the bucket.

In another aspect, a bucket for a bucket elevator defines a vertical axis and a horizontal axis. The bucket generally comprises a bottom wall, a back wall, a front wall and a pair of opposed side walls collectively defining an interior chamber. Each of the side walls has an ear for carrying material above the water level capacity of the bucket and is adapted for spacing less than the nominal projection of the bucket.

In yet another aspect, a bucket elevator generally comprises a housing having a boot section, a head section spaced vertically above the boot section, an ascending leg section extending upward from the boot section to the head section, and a descending leg section extending downward from the head section to the boot section. The boot section includes an inlet for allowing flowable solid materials to enter the housing and the head section includes an outlet for allowing the flowable solid materials to exit the housing. A foot pulley is disposed in the boot section of the housing and a head pulley is disposed in the head section. A continuous belt is supported by the foot and head pulleys for movement in an endless path within the housing. A plurality of buckets is mounted to the continuous belt such that bottoms of the leading buckets are nested with tops of the trailing buckets.

In still another aspect, a method of making a bucket for a bucket elevator is disclosed. The bucket has a bottom wall, a back wall, a front wall and a pair of opposed side walls collectively defining an interior chamber. Each of the side walls has an ear for carrying material above the water level capacity of the bucket. The method generally comprises forming a bucket blank using an injection molding process.

In a further aspect, a bucket is adapted to be spaced relatively close to adjacent buckets and has sides with a contoured upper edge to facilitate carrying material above the water level capacity of the bucket.

DETAILED DESCRIPTION OF THE DRAWINGS

Figure 1:
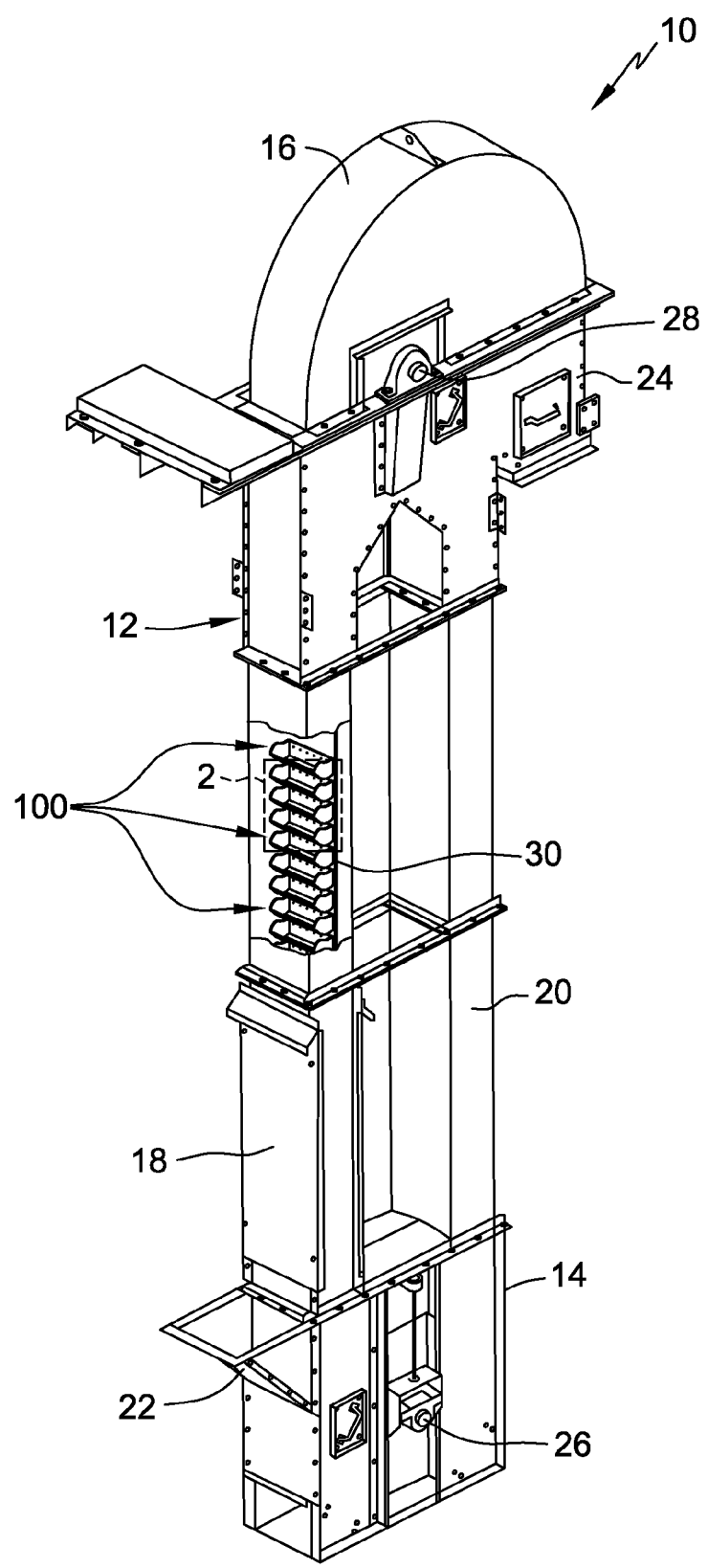
FIG. 1 is a perspective view of an exemplary bucket elevator having a plurality of buckets of one suitable embodiment of the present disclosure.

Referring now to the drawings and in particular to FIG. 1, an exemplary bucket elevator, indicated generally at 10, having a plurality of buckets of one suitable embodiment of the present disclosure is illustrated therein. The buckets of the embodiment seen in FIG. 1 are indicated generally by reference number 100 and described in more detail below. As illustrated in FIG. 1, the bucket elevator 10 comprises a housing, indicated at 12, defining a boot section 14, a head section 16 spaced vertically above the boot section, an ascending leg section 18 extending vertically upward from the boot section to the head section, and a descending leg section 20 extending vertically downward from the head section to the boot section. The boot section 14 includes an inlet 22 (e.g., an inlet chute) for allowing flowable solid materials (e.g., grains, feeds, fertilizers, seeds, food products, chemicals, sand, salt, gravel) to enter the housing 12, and the head section 16 includes an outlet 24 (e.g., an outlet chute), which is spaced vertically from the inlet 22, for allowing the flowable solid materials to exit the housing.

In the illustrated embodiment, a foot pulley 26 is disposed in the boot section 14 of the housing 12, and a head pulley 28 is disposed in the head section 16. A continuous belt 30 is supported by the foot and head pulleys 26, 28 for movement in an endless path within the housing 12. A suitable drive mechanism (not shown), such as an electric motor, is operatively connected to the head pulley 28 for driving the continuous belt 30 about the endless path. Each of the illustrated buckets 100 are mounted to the continuous belt 30. While the bucket elevator 10 illustrated in FIG. 1 is a vertical centrifugal discharge bucket elevator, it is contemplated that the bucket elevator can have any suitable configuration without departing from some aspect of the present disclosure.

In use, solid flowable material is delivered to the boot section 14 of the housing 12 through the inlet 22. As the suitable drive mechanism drives the continuous belt 30 and thus the buckets 100 along the endless path and around the foot pulley 26, the moving buckets scoop up material as they pass through the boot section 14 of the housing 12. The material is then carried vertically upward in the buckets 100 through the ascending leg section 18 to the head section 16. As the buckets 100 containing the material pass over the head pulley 28, centrifugal force throws the material out of the buckets and out of the housing 12 through the outlet 24. The empty buckets 100 then travel downward through the descending leg section 20 to the boot section. The buckets 100 repeat this cycle as long as material is fed through the inlet 22 to the boot section 14 of the housing 12 and the continuous belt 30 is driven along the continuous path by the drive mechanism.

Figure 2:
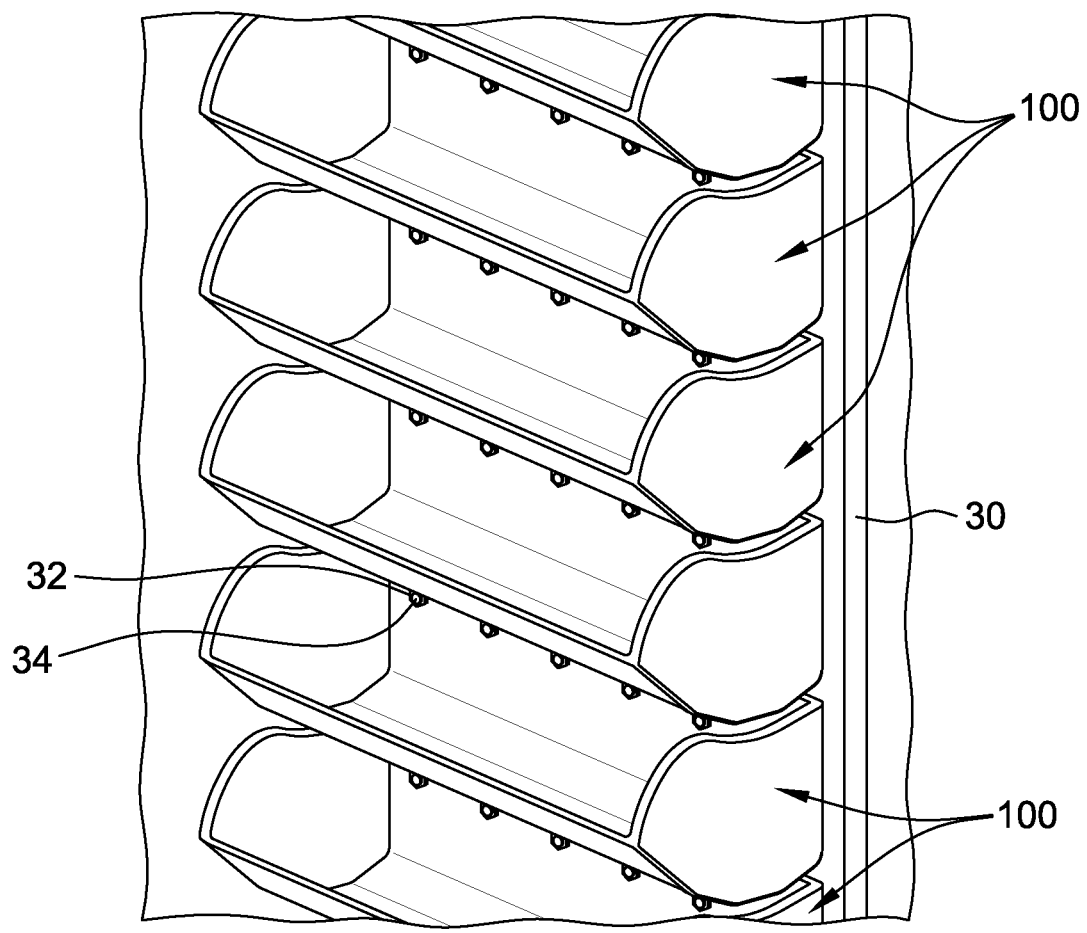
FIG. 2 is an enlarged fragmented view taken from FIG. 1 illustrating five of the plurality of buckets attached to a continuous belt of the bucket elevator.
Figure 3:
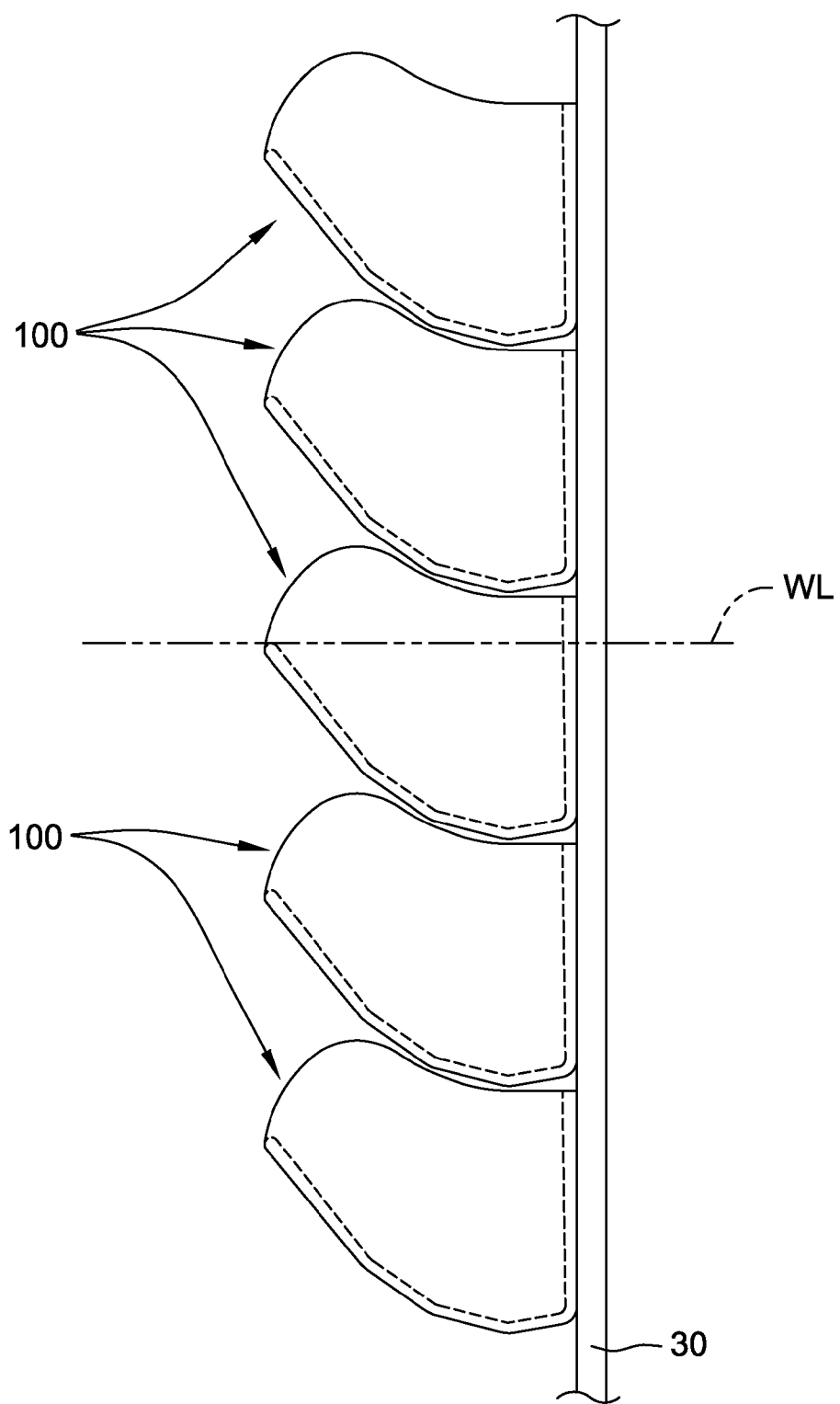
FIG. 3 is a side view of the buckets and continuous belt of FIG. 2.
Figure 4:
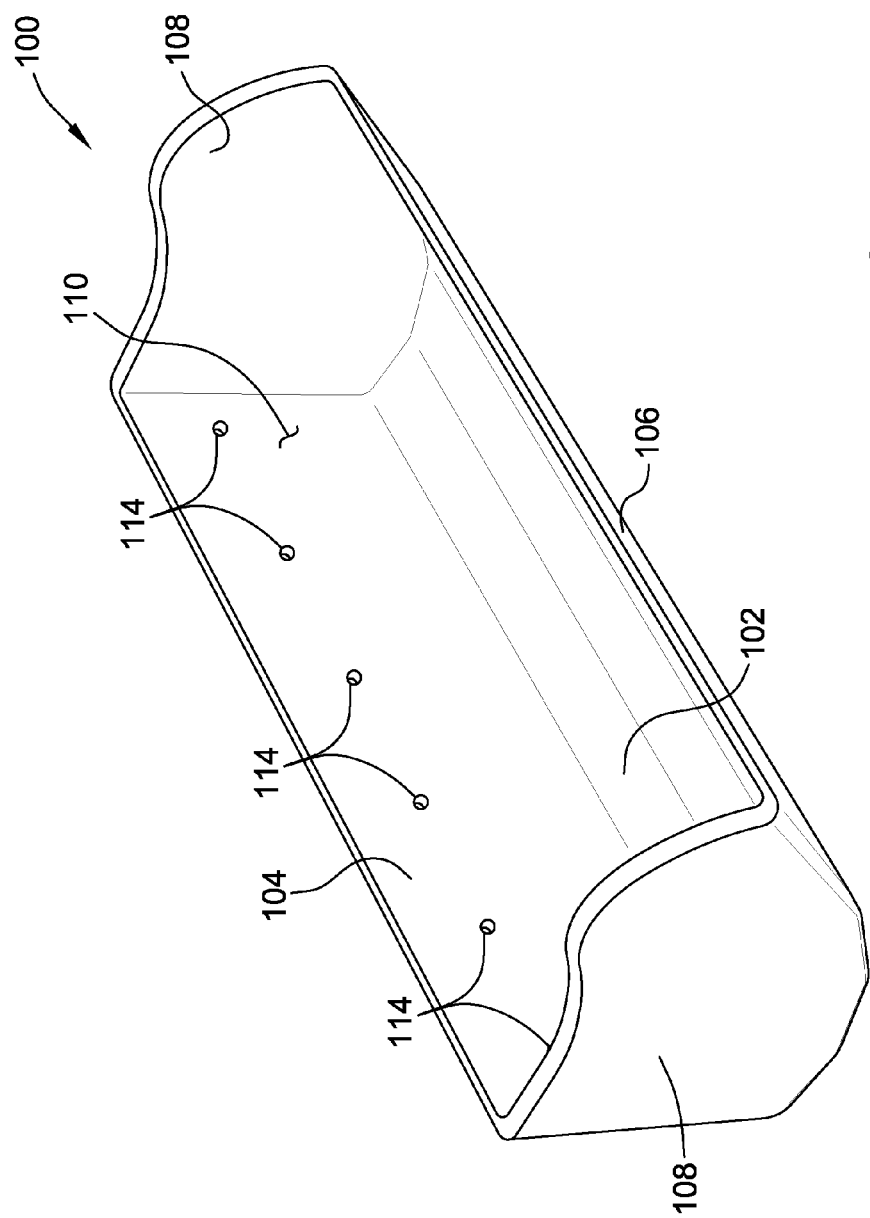
FIG. 4 is a perspective view of one of the buckets of FIG. 1 removed from the bucket elevator.
Figure 5:
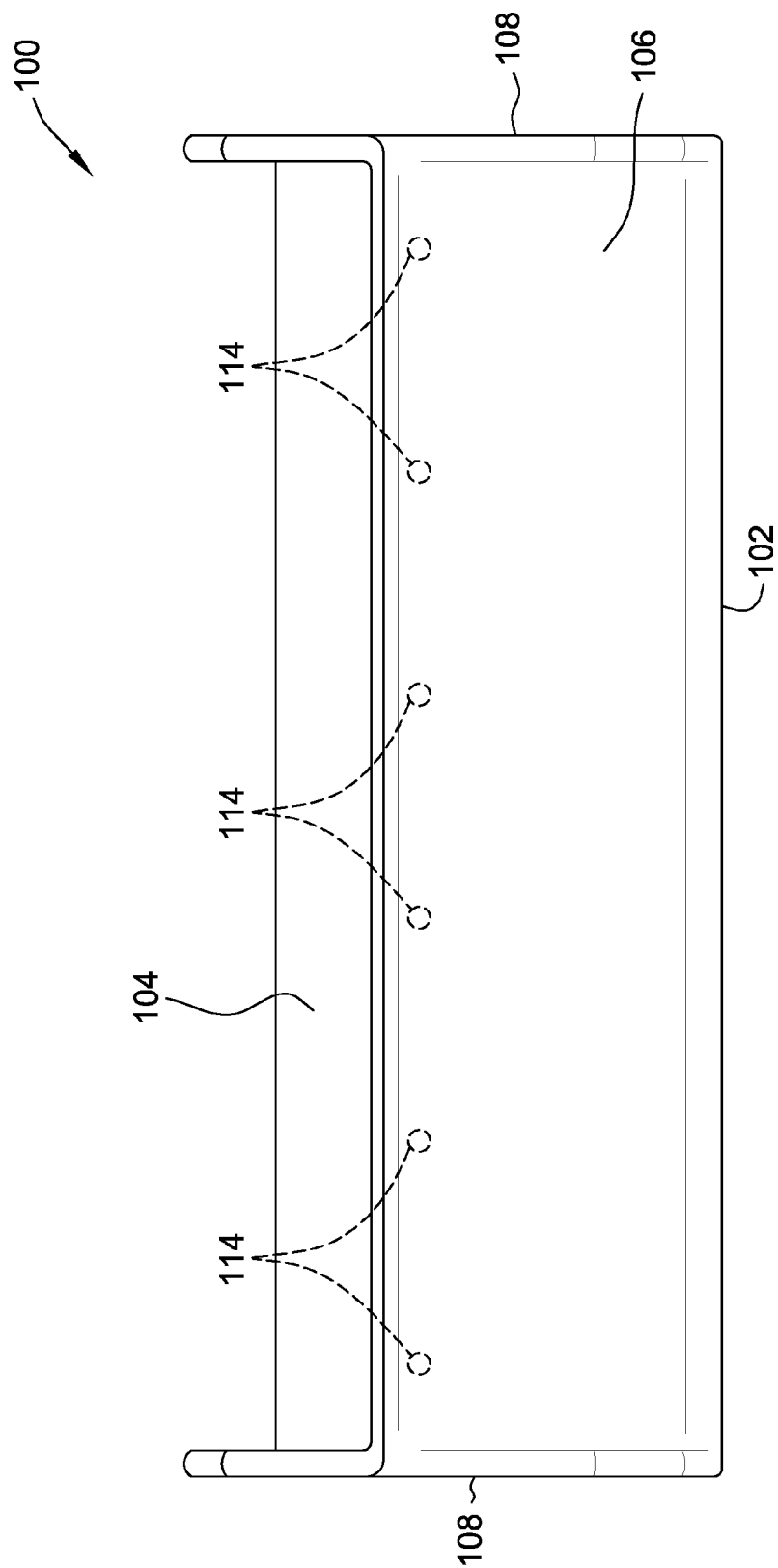
FIG. 5 is a front elevation of the bucket seen in FIG. 4.
Figure 6:
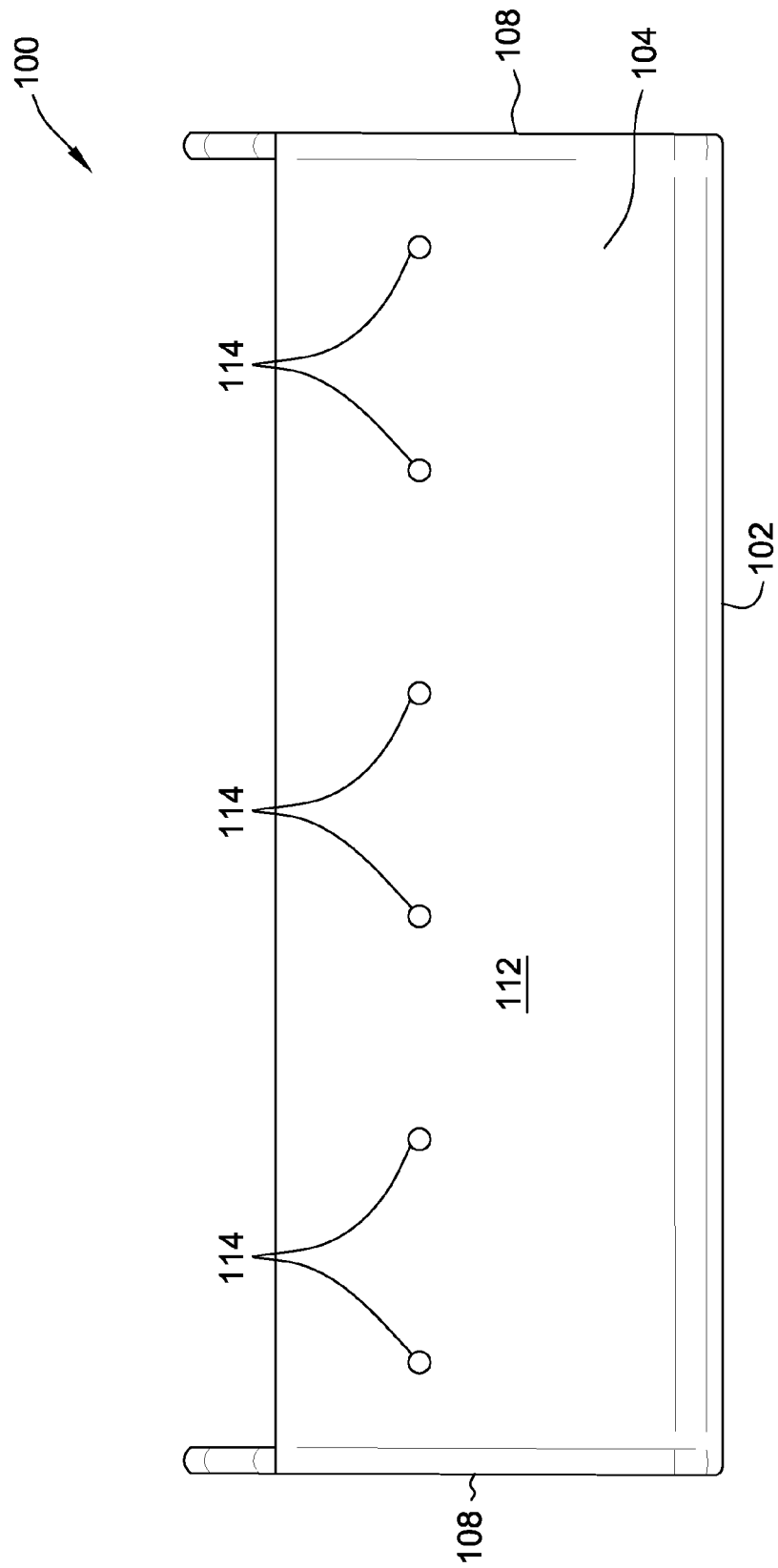
FIG. 6 is a rear elevation thereof.

FIGS. 2 and 3, which are enlarged fragmentary views taken from FIG. 1, illustrate a plurality of the buckets 100 mounted to the continuous belt 30. In the illustrated embodiment, each of the buckets 100 is releasably mounted to the continuous belt 30 using suitable fasteners (e.g., nuts 32 and elevator bolts 34 as seen in FIG. 2). It is understood, however, that the buckets 100 can be mounted to the continuous belt 30 using any suitable method. It is also understood that the buckets 100 of the present disclosure can be mounted to any suitable conveying device without departing from some aspect of this disclosure.

FIGS. 4-10 illustrate one of the buckets 100 seen in FIGS. 1-3 removed from the bucket elevator 10. As illustrated in FIGS. 4-10, the bucket 100 suitably comprises a bottom wall 102, a back wall 104, a front wall 106 and a pair of opposed side walls 108 collectively defining an interior chamber 110 for receiving and transporting flowable solid material. As seen therein, the bucket 100 has an open top defined by the upper edges of the back wall 104, front wall 106, and side walls 108 for providing access to the interior chamber 110. More specifically, the open top allows the bucket 100 to receive and discharge the flowable solid material as the bucket is being moved by the continuous belt 30. It is understood that the interior chamber 110 of the bucket 100 can have any suitable volume. In one suitable embodiment, for example, the interior chamber 110 can have volume between about 0.3 cubic feet and about 0.81 cubic feet or more.

In the illustrated embodiment, the back wall 104 extends generally vertically upward from the bottom wall 102. The back wall 104 defines a generally planer back surface 112 of the bucket 100 adapted for face-to-face engagement with the continuous belt 30 when the bucket is mounted to the belt. A plurality of holes 114 (six being illustrated in FIGS. 4-6) extend through the back wall 104 and are sized and shaped to receive the elevator bolts 34 (or other suitable fastener) used to mount the bucket 100 to the continuous belt 30. It is understood that the back wall 104 can have any suitable number of holes 114. For example, a bucket 100 having a greater interior chamber 110 volume may have more holes 114 than a bucket having a lesser interior chamber volume. The front wall 106 extends upward and outward from the bottom wall 102. In other words, the front wall 106 is outwardly inclined (or angled outward) as it extends away from the bottom wall. The inclined front wall 106 facilitates the bucket 100 scooping materials into its interior chamber 110 and discharging material therefrom as the bucket is being moved by the continuous belt 30.

Figure 7:
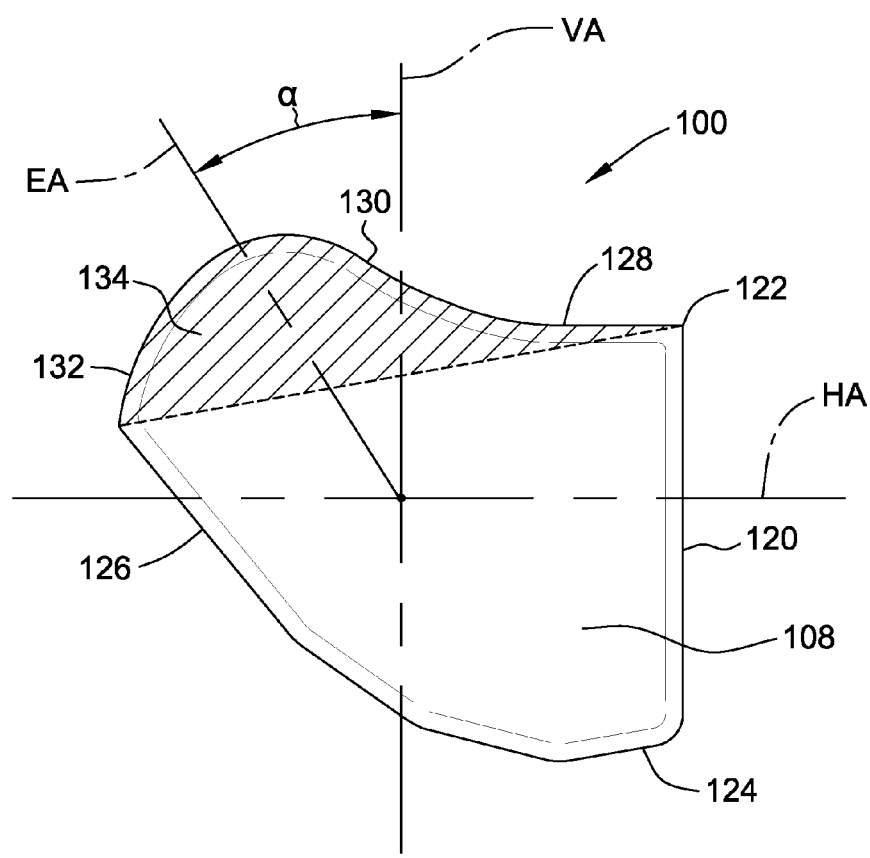
FIG. 7 is a right side elevation thereof.
Figure 8:
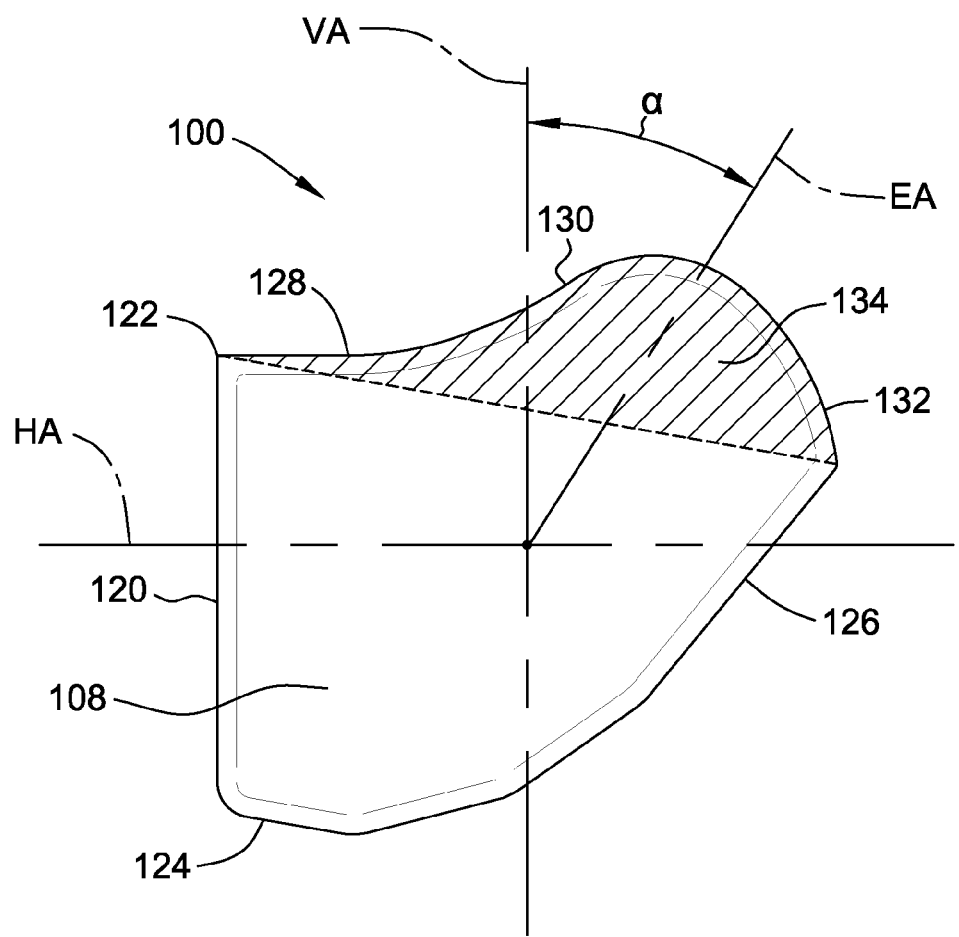
FIG. 8 is a left side elevation thereof.
Figure 9:
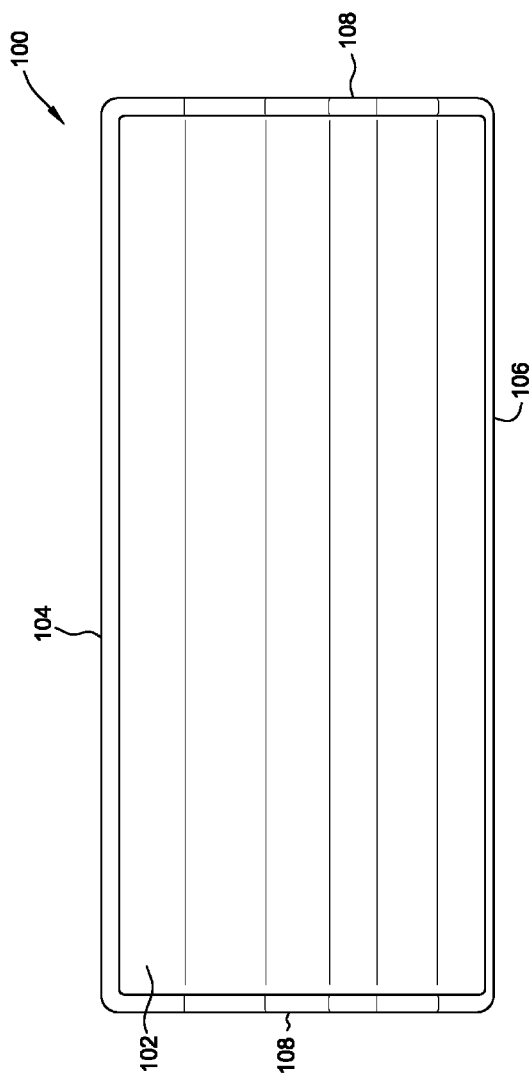
FIG. 9 is a top plan thereof.
Figure 10:
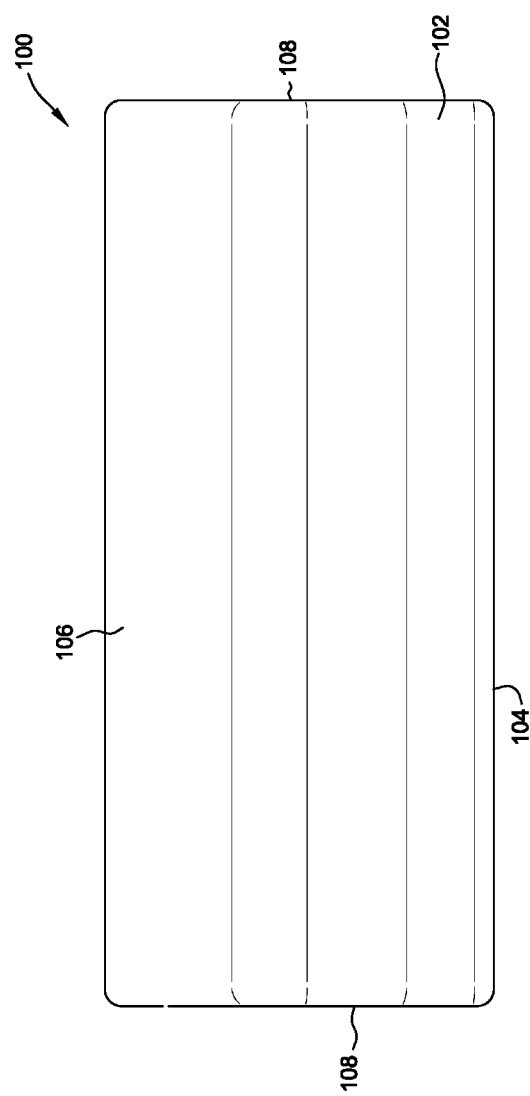
FIG. 10 is a bottom plan thereof.

With reference now to FIGS. 7 and 8, each of the illustrated side walls 108 defines at least four edges: a generally vertical first side edge 120; a contoured upper edge 122; a bottom edge 124; and an angled second side edge 126. In the illustrated embodiment, the first side edge 120 corresponds to the intersection of the back wall 104 with the respective side wall 108, the bottom edge 124 corresponds with the intersection of the bottom wall 102 with the respective side wall, and the second side edge 126 corresponds with the intersection of the front wall 106 with the respective side wall. The contoured upper edge 122 of each of the side walls 108 defines a portion of an upper extent of the bucket 100. As mentioned above, the upper edges 122 of the side walls 108 along with the upper edges of the back and front walls 104, 106 define the open top of the bucket 100. (See, e.g., FIGS. 4 and 9). With reference again to FIGS. 7 and 8, each of the side walls 108 defines a vertical (or first) axis VA and a horizontal (or second) axis HA (as viewed in FIGS. 7 and 8).

Figure 11:
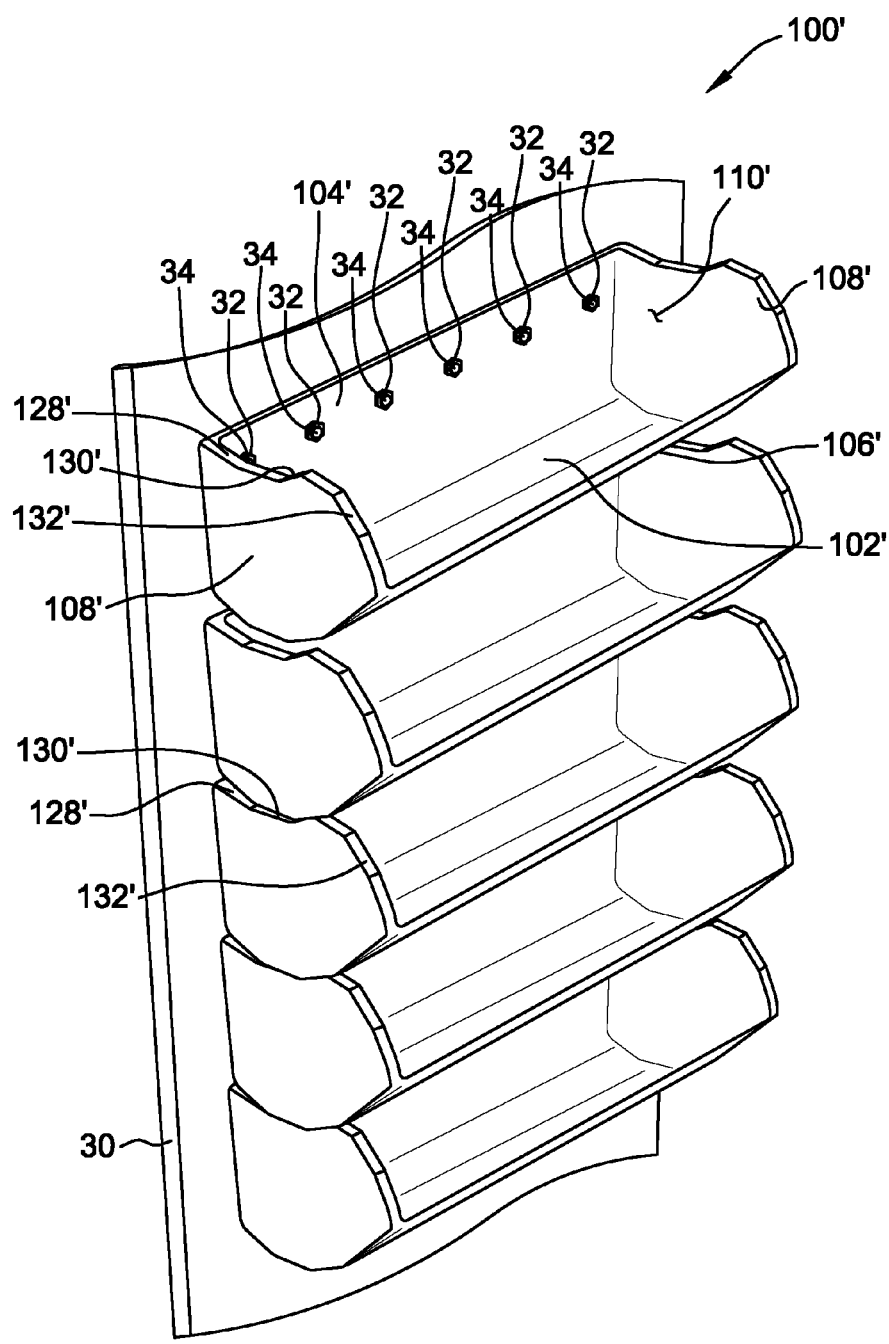
FIG. 11 is a perspective view illustrating a plurality of another suitable embodiment of a bucket of the present disclosure attached to the continuous belt of the bucket elevator.

In the illustrated embodiment, the upper edge 122 of each side wall 108 includes a first, generally horizontal portion 128 extending from the first side edge 120 (and thus the back wall 104), a curved second portion 130 extending upward along a slightly concaved pathway from the first portion, and a curved third portion 132 that extends along a convex pathway from the second portion to the second side edge 126 (and thus the front wall 106). It is contemplated, however, that the upper edge 122 and thus the first, second, and third portions 128, 130, 132 can have any suitable shape and configuration without departing from some aspects of this disclosure. For example, FIG. 11 illustrates an embodiment of the bucket 100' having linear segments defining the first, second, and third portions 128', 130', 132' of the upper edge.

As illustrated in FIGS. 7 and 8, the first, second and third portions 128, 130, 132 cooperatively define the upper extent of an ear 134 of each of the side walls 108. As seen in FIGS. 7 and 8, the ears 134 are a portion of the side walls 108 that are located above the water level capacity of the bucket 100 and indicated in the drawings by cross-hatching. More specifically, the ears 134 of the illustrated embodiment are the portions of the side walls 108 that extend above a line drawn (i.e., the dashed line seen in FIGS. 7 and 8) between the upper extent of the back wall 104 and the upper extent of the front wall 106. The water level capacity WL of the bucket 100 is illustrated in FIG. 3 and, in the illustrated embodiment, is defined by the upper edge of the front wall 106.

In the illustrated embodiment, each of the ears 134 has a generally truncated teardrop shape. That is, each of the ears 134 is generally shaped like a teardrop cut longitudinally in half. More specifically, the ears 134 are rounded or bulbous near the front wall 106 of the bucket 100 and taper from the rounded section towards the back wall 104. Accordingly, the majority of the surface area of each of the ears 134 is disposed forward (i.e., towards the front of the bucket 100) of the vertical axis VA. In other words, more than 50% of the surface area of the ear 134 is disposed forward the vertical axis VA. More suitably, more than 75% of the surface area of the ear 134 is disposed forward the vertical axis VA. In some suitable embodiments, the entire ear 134 can be disposed forward the vertical axis. In such an embodiment, the entire ear 134 would be spaced vertically above the inclined front wall 106. That is, no portion of the ear 134 would be spaced directly above the bottom wall 102. Rather, the ear 134 would be horizontally offset in a forward direction relative to the bottom wall 102.

With reference still to FIGS. 7 and 8, each of the ears 134 has an ear axis EA extending in part horizontally and in part vertically relative to the side wall 108. In one suitable embodiment, the ear axis EA and vertical axis VA cooperatively define an angle a between about 15 degrees and about 55 degrees. In one preferably suitable embodiment, the angle a between the ear axis EA and the vertical axis VA is between about 20 degrees and about 40 degrees. In the illustrated embodiment, for example, the angle a between the ear axis EA and the vertical axis VA is about 26 degrees.

As mentioned above, it is often desirable to mount the maximum number of buckets 100 possible to the continuous belt 30 to thereby maximize the total potential capacity of the bucket elevator. Thus, in one suitable embodiment of the bucket elevator 10, the spacing between buckets 100 is minimized so that the maximum number of buckets can be mounted to the continuous belt 30. When a plurality of buckets 100 of the present disclosure are mounted to the continuous belt 30 as seen in FIGS. 2 and 3, the bottom of the leading buckets 100 can be nested with the top the trailing buckets. More specifically, the bottom of the leading buckets 100, which is defined by the bottom wall 102 and the front wall 106, can be disposed in close proximity (e.g., within about 0.25 inches) from the top of the trailing bucket such that the a portion of the bottom of the leading bucket is offset from and disposed vertically below at least a portion of the top of the trailing bucket. As seen in FIG. 3, the bottom wall 102 and part of the front wall 106 of the leading bucket 100 illustrated therein is offset from and disposed vertically below at least a portion of the ears 134 of each of the side walls 108. The ears 134 of the side walls 108 being located near the front wall 106 facilitate the bucket 100 carrying material above the water level capacity of the bucket.

In one suitable embodiment, for example, the spacing between buckets 100 can be equal to or less than the nominal projection of the bucket. For example, the buckets can suitably be spaced the bucket's nominal projection minus 0.25 inches, 0.5 inches, or 0.75 inches. In one particularly suitable embodiment, the spacing between buckets 100 is the buckets' nominal projection minus 1 inch. It is understood, however, that the buckets 100 can have other suitable spacing without departing from some aspects of this disclosure.

The bucket 100 may be fabricated from any number of materials, for example, but not limited to, suitable plastics (e.g., high density linear polyethylene, thermoplastic urethane, nylon) and suitable metals (e.g., aluminum, stainless steel, carbon steel, ductile iron) and using any suitable method. For example, a bucket fabricated from plastic can be formed using an injection molding process. It is understood that the bucket can be machined following the molding process. In one suitable embodiment, for example, a bucket blank can be formed using an injection molding process and then machined to cut the profiled upper edges of the side walls 108 and the upper edge of the back wall 104. It is understood, however, that the bucket 100 may be constructed of any suitable materials and using any suitable method without departing from some aspects of this disclosure.

Figure 12:
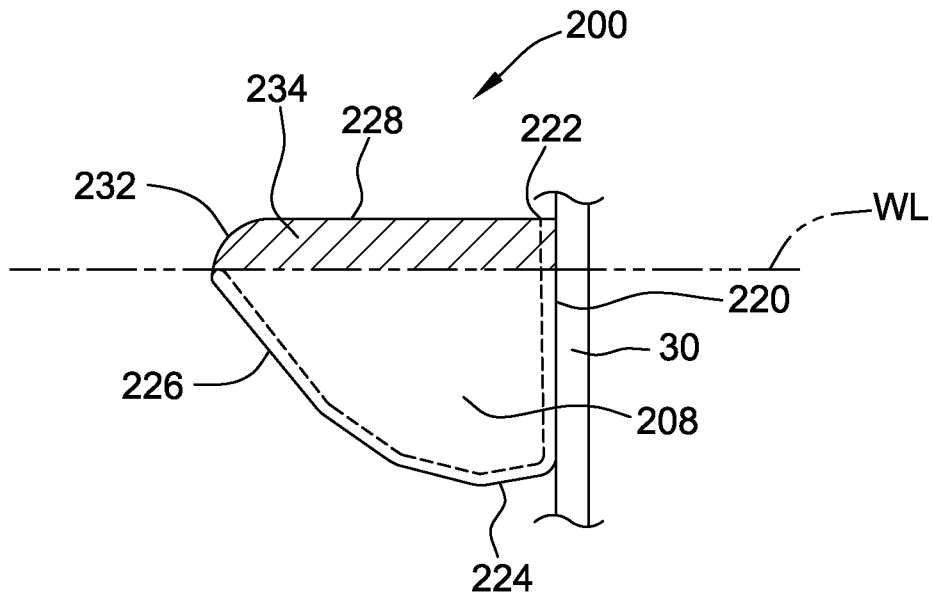
FIG. 12 is a side elevation of another suitable embodiment of a bucket of the present disclosure attached to the continuous belt of the bucket elevator.

FIG. 12 illustrates another suitable embodiment of a bucket, indicated generally at 200. Besides having different side walls 208, the bucket 200 illustrated in FIG. 12 is substantially the same as the bucket 100 illustrated in FIGS. 4-10. As seen therein, each of the side walls 208 of the bucket 200 defines at least four edges: a generally vertical first side edge 220; a contoured upper edge 222; a bottom edge 224; and an angled second side edge 326. In the illustrated embodiment, the first side edge 220 corresponds to the intersection of a back wall of the bucket 200 with the respective side wall 208, the bottom edge 224 corresponds with the intersection of a bottom wall of the bucket with the respective side wall, and the second side edge 226 corresponds with the intersection of a front wall of the bucket with the respective side wall.

The contoured upper edge 222 of the side wall 208 defines a portion of an upper extent of the bucket 200. In the embodiment illustrated in FIG. 12, the upper edge 222 includes a first, generally horizontal portion 228 extending from the first side edge 220 (and thus the back wall of the bucket) and a curved second portion 232 that extends along a convex pathway from the first portion to the second side edge 226 (and thus the front wall of the bucket). As seen in FIG. 12, the side wall 208 of this embodiment includes an ear 234 (i.e., the portion of the side wall located above the water level capacity WL of the bucket 200) indicated in the drawing by cross-hatching. The water level capacity WL of the bucket 200 is illustrated in FIG. 12 and, in the illustrated embodiment, is defined by the upper edge of the front wall of the bucket.

Figure 13:
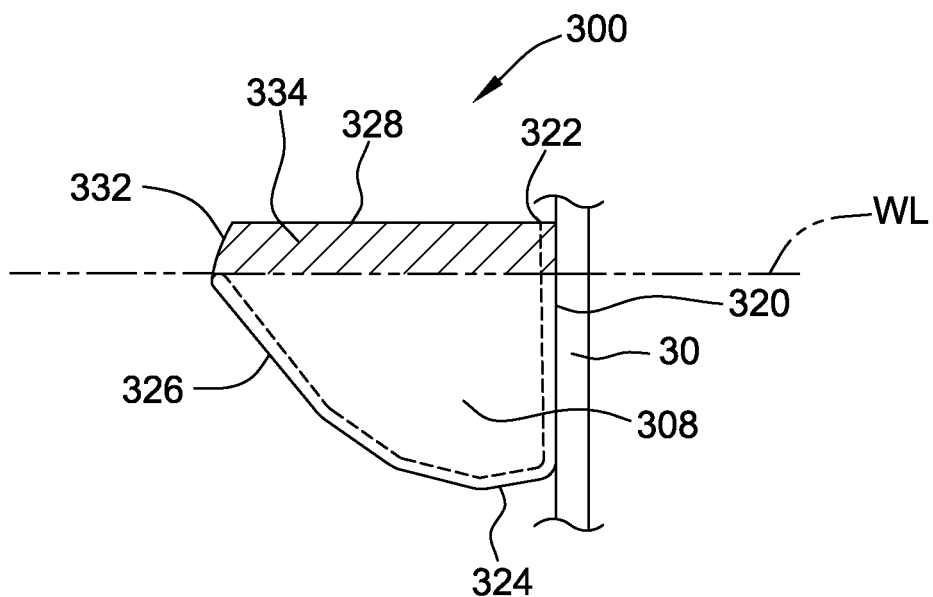
FIG. 13 is a side elevation of still another suitable embodiment of a bucket of the present disclosure attached to the continuous belt of the bucket elevator.

FIG. 13 illustrates yet another suitable embodiment of a bucket, indicated generally at 300. Besides having different side walls 308, the bucket 300 illustrated in FIG. 13 is substantially the same as the bucket 100 illustrated in FIGS. 4-10. As seen therein, each of the side walls 308 of the bucket 300 defines at least four edges: a generally vertical first side edge 320; a contoured upper edge 322; a bottom edge 324; and an angled second side edge 326. In the illustrated embodiment, the first side edge 320 corresponds to the intersection of a back wall of the bucket 300 with the respective side wall 308, the bottom edge 324 corresponds with the intersection of a bottom wall of the bucket with the respective side wall, and the second side edge 326 corresponds with the intersection of a front wall of the bucket with the respective side wall.

The contoured upper edge 322 of the side wall 308 defines a portion of an upper extent of the bucket 300. In the embodiment illustrated in FIG. 13, the upper edge 322 includes a first, generally horizontal portion 328 extending from the first side edge 320 (and thus the back wall of the bucket) and a second portion 332 that extends from the first portion to the second side edge 326 (and thus the front wall of the bucket). As seen in FIG. 13, the side wall 308 of this embodiment includes an ear 334 (i.e., the portion of the side wall located above the water level capacity WL of the bucket 300) indicated in the drawing by cross-hatching. The water level capacity WL of the bucket 300 is illustrated in FIG. 13 and, in the illustrated embodiment, is defined by the upper edge of the front wall of the bucket.

When introducing elements of the present invention or the embodiment(s) thereof, the articles "a," "an," "the," and "the" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A bucket for a bucket elevator comprising a bottom wall, a back wall, a front wall and a pair of opposed side walls collectively defining an interior chamber, each of the side walls having a contoured upper edge to facilitate carrying material above the water level capacity of the bucket, the bucket being adapted for spacing relative to an adjacent bucket less than the nominal projection of the bucket.

2. The bucket set forth in claim 1 wherein the contoured upper edge includes a first generally horizontal portion extending from the back wall, a second portion extending upward from the first portion, and a third portion that extends from the second portion to the front wall.

3. The bucket set forth in claim 2 wherein the second portion is convex and the third portion is concaved.

4. The bucket set forth in claim 3 wherein the upper edge defines a generally truncated teardrop shape.

5. A bucket elevator comprising a plurality of the buckets set forth in claim 1.

6. The bucket elevator set forth in claim 5 wherein the spacing between buckets is less than nominal projection.

7. A bucket for a bucket elevator defining a vertical axis and a horizontal axis, and comprising a bottom wall, a back wall, a front wall and a pair of opposed side walls collectively defining an interior chamber, each of the side walls having an ear for carrying material above the water level capacity of the bucket, the bucket being adapted for spacing relative to an adjacent bucket less than the nominal projection of the bucket.

8. The bucket set forth in claim 7 wherein each of the ears is generally truncated teardrop shaped.

9. The bucket set forth in claim 8 wherein each of the ears comprises a bulbous portion disposed adjacent the front wall and a tapered portion disposed adjacent the back wall, the tapered portion tapering downward from the bulbous portion to the back wall.

10. The set forth in claim 7 wherein more than 50 percent of the surface area of each of the ears is forward the vertical axis.

11. A bucket elevator comprising a plurality of the buckets set forth in claim 7.

12. The bucket elevator set forth in claim 11 wherein the spacing between buckets is less than nominal projection.

13. A centrifugal bucket elevator comprising:

a housing having a boot section, a head section spaced vertically above the boot section, an ascending leg section extending upward from the boot section to the head section, and a descending leg section extending downward from the head section to the boot section, the boot section including an inlet for allowing flowable solid materials to enter the housing, the head section including an outlet for allowing the flowable solid materials to exit the housing;

a foot pulley disposed in the boot section of the housing;

a head pulley disposed in the head section;

a continuous belt supported by the foot and head pulleys for movement in an endless path within the housing; and a plurality of buckets mounted to the continuous belt such that bottoms of the leading buckets are nested with tops of the trailing buckets, each of the buckets being configured such that centrifugal force is able to throw material out of the bucket and out of the housing through the outlet.

14. The bucket elevator set forth in claim 13 wherein bottoms of the leading bottoms are approximately 0.25 inches from the tops of the trailing buckets.

15. The bucket elevator set forth in claim 13 wherein the spacing between the buckets is less than the nominal projection of the bucket.

16. The bucket elevator set forth in claim 15 wherein the spacing between buckets is the nominal projection minus 1 inch.

17. The bucket elevator set forth in claim 13 wherein each of the buckets comprising a bottom wall, a back wall, a front wall and a pair of opposed side walls collectively defining an interior chamber, each of the side walls having an ear for carrying material above the water level capacity of the bucket.

18. The bucket elevator set forth in claim 17 wherein the bottom wall and a portion of the front wall of the leading buckets are offset from and disposed vertically below a portion the ears of the trailing buckets.

19. A method of making a bucket for a bucket elevator, the bucket having a bottom wall, a back wall, a front wall and a pair of opposed side walls collectively defining an interior chamber, each of the side walls having an ear for carrying material above the water level capacity of the bucket, the method comprising:

forming a bucket blank using an injection molding process.

20. The method of making a bucket set forth in claim 19 further comprising machining the bucket blank to form the ears on each of the side walls.

21. The method of making a bucket set forth in claim 20 further comprising cutting material from the upper edge of the back wall.

* * * * *